United States Patent [19]

Smemo et al.

[11] Patent Number: 4,819,755

[45] Date of Patent: Apr. 11, 1989

[54] TELESCOPING DRIVE SHAFT HAVING LUBRICATING PASSAGE

[75] Inventors: Alfred S. Smemo; Daniel J. Paisley; Gary L. Baskerville, all of Dubuque, Iowa

[73] Assignee: Deere & Company, Moline, Ill.

[21] Appl. No.: 167,600

[22] Filed: Mar. 14, 1988

[51] Int. Cl.$^4$ .............................................. B60K 17/00
[52] U.S. Cl. .................................... 180/70.1; 180/235
[58] Field of Search ............... 180/70.1, 235; 464/162, 464/167

[56] References Cited

U.S. PATENT DOCUMENTS 3,242,695  3/1966  Ross, Jr. .................. 464/162
4,325,445  4/1982  Albee ....................... 180/235

Primary Examiner—Kenneth R. Rice

[57] ABSTRACT

A telescoping drive shaft comprising a first drive shaft element which telescopingly receives a second drive shaft element which is provided with lubricating passages. Lubricating grease held in the first drive shaft element can be directed through the lubricating passages to the intermeshed splines of the two drive shaft elements. A non-positive seal at the end of the first drive shaft element is used to exhaust excess lubricating grease from the drive shaft.

6 Claims, 1 Drawing Sheet

TELESCOPING DRIVE SHAFT HAVING LUBRICATING PASSAGE

BACKGROUND OF THE INVENTION

1. Field of the Invention

The invention is directed to a telescoping drive shaft having internal passages for directing lubricating grease to the engaging assemblies of the shaft elements.

2. Description of the Prior Art

Many large four-wheel drive work vehicles, such as agricultural tractors, industrial loaders, and logging skidders are articulated in the middle. That is, the front and rear wheel assemblies can pivot with respect to one another. Typically, the front wheels are provided with a differential mounted on a front housing portion whereas the rear wheels are provided with a rear differential mounted on a rear housing portion. The two housing portions are pivotally coupled to one another along a vertical axis. To transmit power to each differential assembly, a drive line extends across the articulation point. To account for changes in length of the drive line as the vehicle articulates, a portion of the drive line includes a telescoping drive shaft. This drive shaft is provided with universal couplings at either end to account for axial misalignment.

As shown in FIG. 2A which illustrates a prior art telescoping drive shaft, the drive shaft comprises a first drive shaft element 10 telescopicingly receives second drive shaft element 12. The first drive shaft element is provided with internal splines 14 which cooperate with external splines 16 of the second shaft element forming engaging assemblies. In this way, rotational movement can be transmitted between the two drive shaft elements, and, therefore, across the drive line. It should be appreciated that the two drive shaft elements can reciprocate relative to one another.

To assure that the drive shaft elements can reciprocate relative to one another, it is necessary that the splines be adequately lubricated. To accomplish this, lubricating grease is injected through grease fitting 18 into the hollow interior formed by the first shaft element. The lubricating grease is held in this hollow interior which forms a lubricant holding chamber 20. As the drive shaft elements reciprocate with respect to one another, the lubricant is forced along the splines lubricating them. Excess lubricant is exhausted through aperture 24 formed in end plate 26. The assembly is also provided with a seal 28 located at the end of first drive shaft element 10.

Telescoping drive shafts such as the one discussed above have not proved to be entirely satisfactory. The majority of the fresh grease injected into chamber 20 is typically exhausted through aperture 24 and does not reach the intermeshed splines.

SUMMARY OF THE INVENTION

The present invention is directed to a method of supplying fresh lubricant to the intermeshed splines. This is accomplished by forming a passage in the second drive shaft element which provides a conduit for the lubricating grease from the lubricating chamber to the intermeshed splines. In addition, the exhaust aperture in the first drive shaft element is eliminated so that a lubricating grease is forced up through the spline assembly where it can exit through the non-positive seal.

The subject telescoping drive shaft assembly comprises a first shaft element that is similar to the prior art except that the exhaust aperture in the end plate is eliminated. The second drive shaft element is provided with the lubricating passage which starts at the lateral end face of the drive shaft element and extends to the end of the splines. A portion of the passage extends along the central longitudinal axis of the second drive shaft element and from there extends radially outward through a plurality of passages to the splines.

DESCRIPTION OF THE PREFERRED EMBODIMENT

Figure 1:
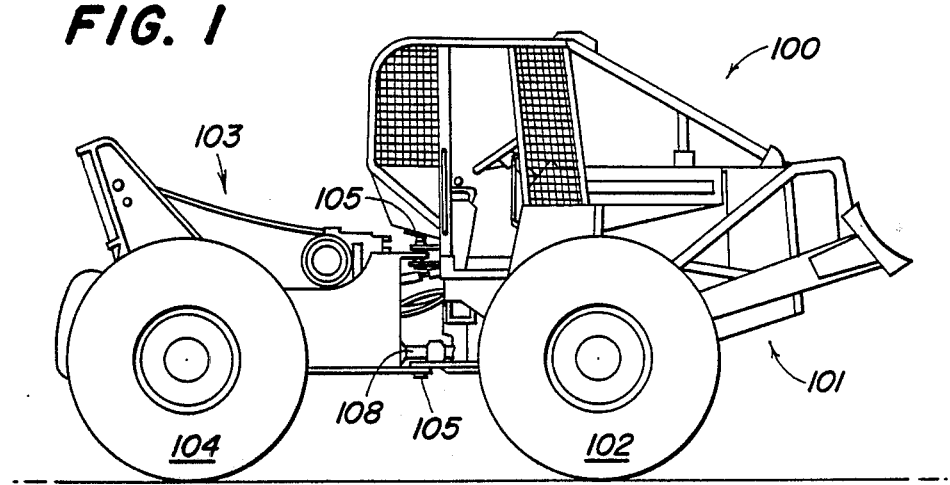
FIG. 1 is a side view of the log skidder having a telescoping drive shaft.
Figure 2A:
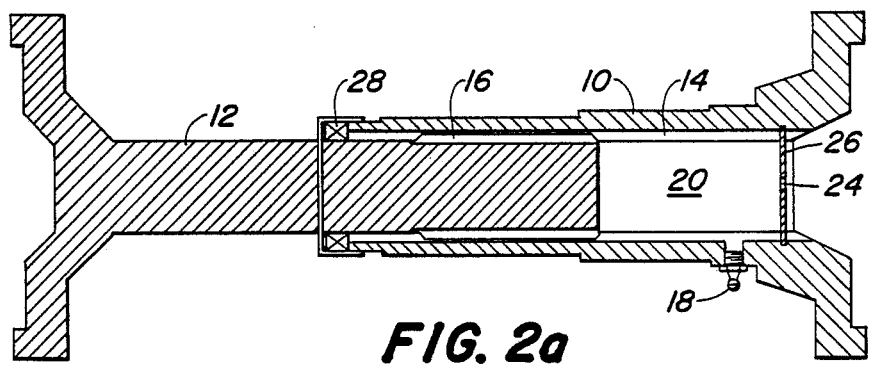
FIG. 2A is a cross sectional side view of a prior art telescoping drive shaft.
Figure 2B:
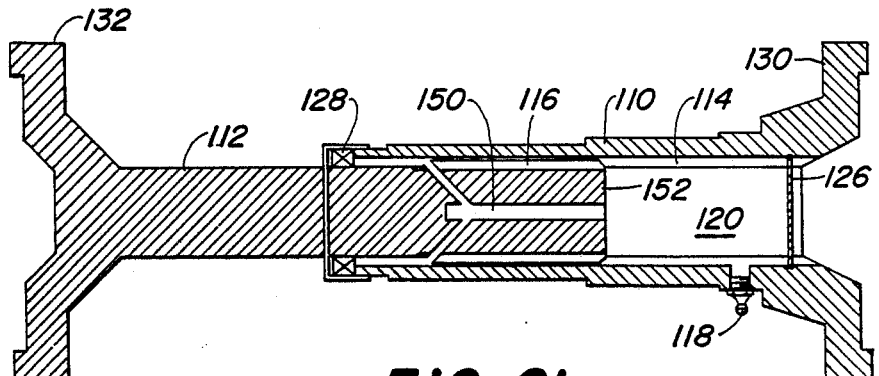
FIG. 2B is a cross sectional side view of the subject telescoping drive shaft.

FIG. 1 illustrates a four-wheel drive articulated log skidder 100 having a telescoping drive shaft 108. Although the subject drive shaft is illustrated as being included in a logging skidder, it can also be used in other articulated vehicles such as four-wheel drive articulated loaders and four-wheel drive articulated agricultural tractors. Skidder 100 is provided with a front frame portion 101 from which extends wheel 102 and a rear frame portion 103 from which extends wheels 104. The skidder is articulated along a vertical axis defined by pivots 105. The front frame portion houses the front differential which is used to drive the front wheels whereas the rear frame portion is provided with a rear differential for driving the rear wheels. Both of these differentials are interconnected by a drive line that includes the telescoping drive shaft 108. A power supply, such as an internal combustion engine, is housed together with a transmission in the front frame portion and rotates the drive line.

The first drive shaft element 110 is identical to the prior art drive shaft element except that end plate 126 is not provided with an exhaust aperture. This drive shaft element is provided with a universal coupling 130 so that it can be coupled to other portions of the drive line.

The second drive shaft element 112 is substantially similar to the prior art drive shaft element except that it is provided with lubricating passage 150. This lubricating passage extends from lateral end face 152 along the central longitudinal axis defined by the second drive shaft element. A plurality of radially extending passages extend off this main passage for directing grease to the spline engaging assemblies 116 and 114. Lubricating grease is injected into chamber 120 through grease fitting 118 and is exhausted through seal 128.

As with the first drive shaft element 110, the second drive shaft element 112 is also provided with a universal coupling assembly 132.

The external splines of the second drive shaft element 112 extend from the lateral end face 152 longitudinally along the drive shaft element. The radially extending lubricating passages supply grease to the termination point of the splines 116.

As the telescoping drive shaft elements move with respect to one another the intermeshed splines are lubricated by fresh grease from chamber 120. As the elements move together grease from chamber 120 is forced between the splines and through lubricating passage 150 to the termination point of splines 166. As the drive shaft elements are drawn apart, lubricating grease stored between the termination point and seal 128 is directed through the splines and passage 150.

Seal 128 is not a positive seal, but rather a lint wiper, and as such can exhaust excess grease. Seal 128 may comprise a felt washer, or be formed from other similar soft materials.

This invention should not be limited by the above described embodiments, but should be limited solely by the claims that follow.

I claim:

1. A telescoping drive shaft comprising:
    a first shaft element having a hollow interior for holding lubricant, the first shaft element is also provided with longitudinally extending internal splines;
    a second shaft element having a central longitudinal axis is inserted into the first shaft element and is free to reciprocate therein, the second shaft element is also provided with a lateral end face which is located adjacent to the hollow interior of the first shaft element, the second shaft element is further provided with longitudinally extending external splines which cooperate with the longitudinally extending internal splines of the first shaft element to transmit rotational movement between the drive shaft elements; and
    a non-positive seal is positioned between the first shaft element and the second shaft element, the seal permitting the exhaust flow of fluid between the first and second shaft elements;
    whereby the second shaft element is provided with a lubricating passage which communicates with the hollow interior of the first shaft element and for transmitting lubricant from the hollow interior to the engaging assemblies, a portion of the lubricating passage extends along the central longitudinal axis of the second shaft element, the lubricating passage is also provided with a plurality of radial passageways which extend outward from the lubricating passage portion extending along the central longitudinal axis of the second drive shaft element, the radial passageways communicating with the internal and external splines of the first and second drive shaft elements at the termination point of the second shaft element.

2. A telescoping drive shaft as defined in claim 1 wherein the first drive shaft element and the second drive shaft element are both provided with universal couplings.

3. A telescoping drive shaft element comprising:
    a longitudinal member having a central longitudinal axis and a lateral end face;
    a universal coupling assembly located at one end of the longitudinal member;
    longitudinally extending external splines extending outwardly from the other end of the longitudinal member, the external splines extend longitudinally from the lateral end face of the longitudinal member to a termination point; and
    a lubricating passage extending within the longitudinal shaft from the lateral end face to the termination point of the external splines.

4. A telescoping drive shaft element as defined by claim 3 wherein a portion of the lubricating passage extends along the central longitudinal axis of the longitudinal member where it is joined by a plurality of radial passageways which extend outward therefrom to the termination point of the external splines.

5. An articulated four-wheel drive work vehicle having a power plant for driving ground engaging wheels, the power plant having a drive line that extends across the articulation, the drive line being provided with a telescoping drive shaft, the telescoping drive shaft comprising:
    a first shaft element having a hollow interior for holding lubricant, the first shaft element is also provided with longitudinally extending internal splines;
    a second shaft element having a central longitudinal axis is inserted into the first shaft element and is free to reciprocate therein, the second shaft element is also provided with a lateral end face which is located adjacent to the hollow interior of the first shaft element, the second shaft element is further provided with longitudinally extending splines which cooperate with the longitudinally extending internal splines of the first shaft element to transmit rotational movement between the drive shaft elements; and
    a non-positive seal is positioned between the first shaft element and the second shaft element, the seal permitting the exhaust flow of fluid between the first and second shaft elements;
    whereby the second shaft element is provided with a lubricating passage which communicates with the hollow interior of the first shaft element and for transmitting lubricant from the hollow interior to the engaging assemblies, a portion of the lubricating passage extends along the central longitudinal axis of the second shaft element, the lubricating passage is also provided with a plurality of radial passageways which extend outward from the lubricating passage portion extending along the central longitudinal axis of the second drive shaft element, the radial passageways communicating with the internal and external splines of the first and second drive shaft elements at the termination point of the second shaft element.

6. A work vehicle as defined in claim 5 wherein the first drive shaft element and the second drive shaft element are both provided with universal couplings.

* * * * *